(12) United States Patent
Lehti (10) Patent No.: US 11,679,818 B2
(45) Date of Patent: Jun. 20, 2023

(54) VEHICLE TAILGATE ASSEMBLY

(71) Applicant: Multimatic Inc., Markham (CA)

(72) Inventor: Michael Lehti, Markham (CA)

(73) Assignee: Multimatic Inc., Markham (CA)

( * ) Notice: Subject to any disclaimer, the term of this patent is extended or adjusted under 35 U.S.C. 154(b) by 0 days.

(21) Appl. No.: 17/791,683

(22) PCT Filed: Jan. 12, 2021

(86) PCT No.: PCT/CA2021/050022
§ 371 (c)(1),
(2) Date: Jul. 8, 2022

(87) PCT Pub. No.: WO2021/142533
PCT Pub. Date: Jul. 22, 2021

(65) Prior Publication Data
US 2023/0119274 A1   Apr. 20, 2023

Related U.S. Application Data

(60) Provisional application No. 62/960,750, filed on Jan. 14, 2020.

(51) Int. Cl.
*B62D 33/00* (2006.01)
*B62D 33/03* (2006.01)

(52) U.S. Cl.
CPC .................... *B62D 33/03* (2013.01)

(58) Field of Classification Search
CPC ........ B62D 33/03; B62D 33/0273; B60P 3/40
USPC ................. 296/51, 55, 57.1, 61, 62
See application file for complete search history.

(56) References Cited

U.S. PATENT DOCUMENTS

| 3,063,739 A | 11/1962 | Davies |
| 4,750,777 A * | 6/1988 | Brammer ........... B62D 33/0273 296/50 |
| 6,283,525 B1 | 9/2001 | Morse |
| 6,764,130 B1 * | 7/2004 | Hull .................... B62D 33/0273 296/57.1 |

(Continued)

FOREIGN PATENT DOCUMENTS

CA   2366149 C   4/2004

OTHER PUBLICATIONS

International Preliminary Report on Patentability for International Application No. PCT/CA2021/050022, dated Jul. 19, 2022.

*Primary Examiner* — Stephen T Gordon
(74) *Attorney, Agent, or Firm* — Borden Ladner Gervais LLP; Brandon L. Evenson (57) ABSTRACT

A vehicle tailgate assembly comprises a frame with a transverse base and support arms extending perpendicularly therefrom adjacent distal ends of the base, a central section also extending perpendicularly from the base but to a lesser extent than the support arms, a door rotationally mounted to the frame between the support arms, the door being profiled with a central opening matching the central section and aligned therewith in a co-planar manner when the door is in a fully closed position, a mating portion comprising an indentation in the door adapted to mate with the central section when the door is rotated 180 degrees from the fully closed position to a working position to expose the central opening with the door co-planar with the frame.

9 Claims, 13 Drawing Sheets

(56) References Cited

U.S. PATENT DOCUMENTS

| | | | |
|---|---|---|---|
| 7,100,956 B1 * | 9/2006 | Wilkins | B62D 33/0273 296/50 |
| 9,789,912 B1 | 10/2017 | Marchlewski et al. | |
| 2009/0183433 A1 | 7/2009 | Cheung et al. | |

* cited by examiner

VEHICLE TAILGATE ASSEMBLY

FIELD OF THE INVENTION

This invention relates to the field of vehicle tailgates with particular application to tailgates for pick-up trucks.

BACKGROUND TO THE INVENTION

Pick-up trucks generally require tailgates which can swing open to allow certain access. Pick-up trucks are often fitted with trailer hitch assemblies which can be mounted adjacent the rear of the vehicle to accept a trailer which is located rear of the vehicle. Alternatively, or in addition, pick-up trucks may be fitted with a fifth wheel hitch assembly to accept a trailer which overlaps the truck bed. A receiving assembly, such as a fifth wheel trailer hitch, is mounted in the bed of the truck and a mating assembly, such as a gooseneck, is mounted to the forward end of the trailer. Traditionally, use of a fifth wheel trailer hitch required removal of the tailgate to permit access of the trailer's mating assembly to the bed-mounted hitch assembly with the trailer overlapping the truck cargo area. A flexible or mesh tailgate was typically substituted for a solid tailgate to restrain materials from exiting the truck bed cargo area while trailer hook-up was in place. This substitute tailgate required time to install and remove and reduced the structural strength of the tailgate, among other disadvantages. In addition to the issue of fifth wheel trailers, there has also been a need for versatile, factory installed tailgates which can perform in a number of situations where complete closure of the tailgate, or complete opening of the tailgate to a dropped vertical position, were not ideal.

SUMMARY OF THE INVENTION

Accordingly, it would be desirable to have a tailgate which could remain secured to the truck during installation and operation of a fifth wheel trailer. It would also be desirable to have a tailgate which could be opened in a variety of positions to facilitate secure transportation of oversize cargo with minimal risk to the material. It would also be desirable to have a tailgate which permitted enhanced access of the user to the truck bed.

In accordance with a principal aspect of the invention, a vehicle tailgate assembly comprises a frame with a transverse base and support arms extending perpendicularly therefrom adjacent distal ends of the base, a central section also extending perpendicularly from the base but to a lesser extent than the support arms, a door rotationally mounted to the frame between the support arms, the door being profiled with a central opening matching the central section and aligned therewith in a co-planar manner when the door is in a fully closed position, a mating portion comprising an indentation in the door adapted to mate with the central section when the door is rotated 180 degrees from the fully closed position to a working position to expose the central opening with the door co-planar with the frame.

In a further aspect of the invention, the door is releasably latched to the frame in the closed position and the working position.

In a further aspect of the invention, the central section is trapezoidal.

In a further aspect of the invention, the central opening is shaped to facilitate access of a trailer connector to a fifth wheel hitch mounted in a bed of a pick-up truck.

In a further aspect of the invention, the door is additionally releasably latched in at least one position which is not co-planar with the frame.

In a further aspect of the invention, the door and the frame in a co-planar orientation are adapted to be releasably latched in at least one position which is neither the fully closed position nor the working position.

In a further aspect of the invention, the tailgate assembly is releasably latched to the side walls of a pick-up truck cargo area.

In a further aspect of the invention, the door is latched in a horizontal orientation to the support arms.

In a further aspect of the invention, the support arms are latched in a horizontal orientation to a truck body and the door is latched in a vertical orientation to the support arms.

Further aspects of the invention will become apparent from the following description.

DETAILED DESCRIPTION OF THE INVENTION

Figure 1:
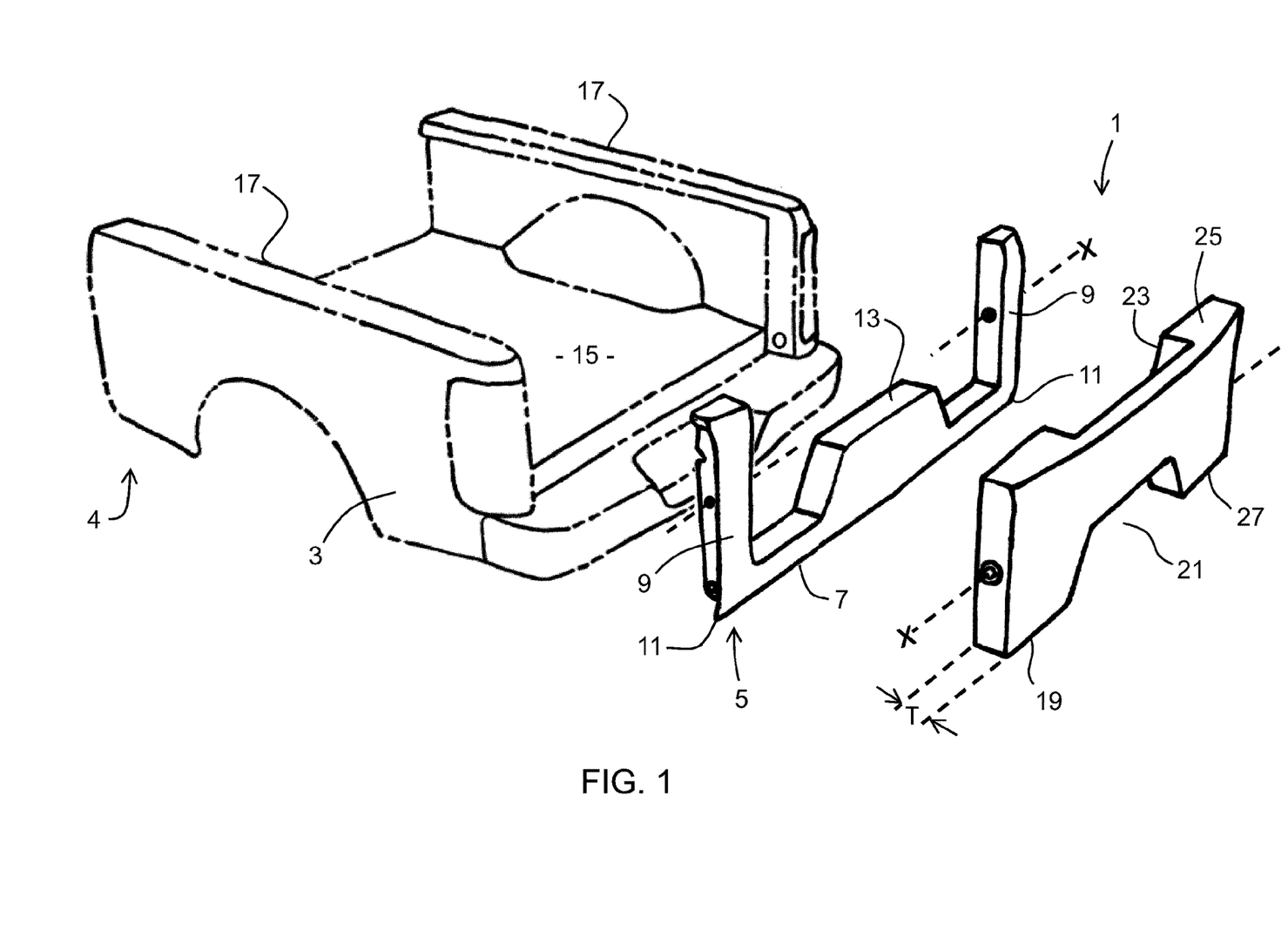
FIG. 1 is an exploded perspective view of the vehicle tailgate assembly of the invention.

Referring to FIG. 1, a vehicle tailgate assembly 1 is adapted to be attached to the body 3 of a vehicle 4, typically a pick-up truck. The tailgate assembly 1 comprises a tailgate frame 5 with a transverse base 7 and support arms 9 extending perpendicularly from the base 7 adjacent the distal ends 11 of the base 7. A central section 13 of the frame 5 also extends perpendicularly from the base 7, but to a lesser extent than do the support arms 9. The tailgate frame 5 is mounted to the vehicle pick-up adjacent the rear of a truck bed 15 and side walls 17. The frame 5 is mounted conventionally to the truck body 3 as known in the art.

Figure 2:
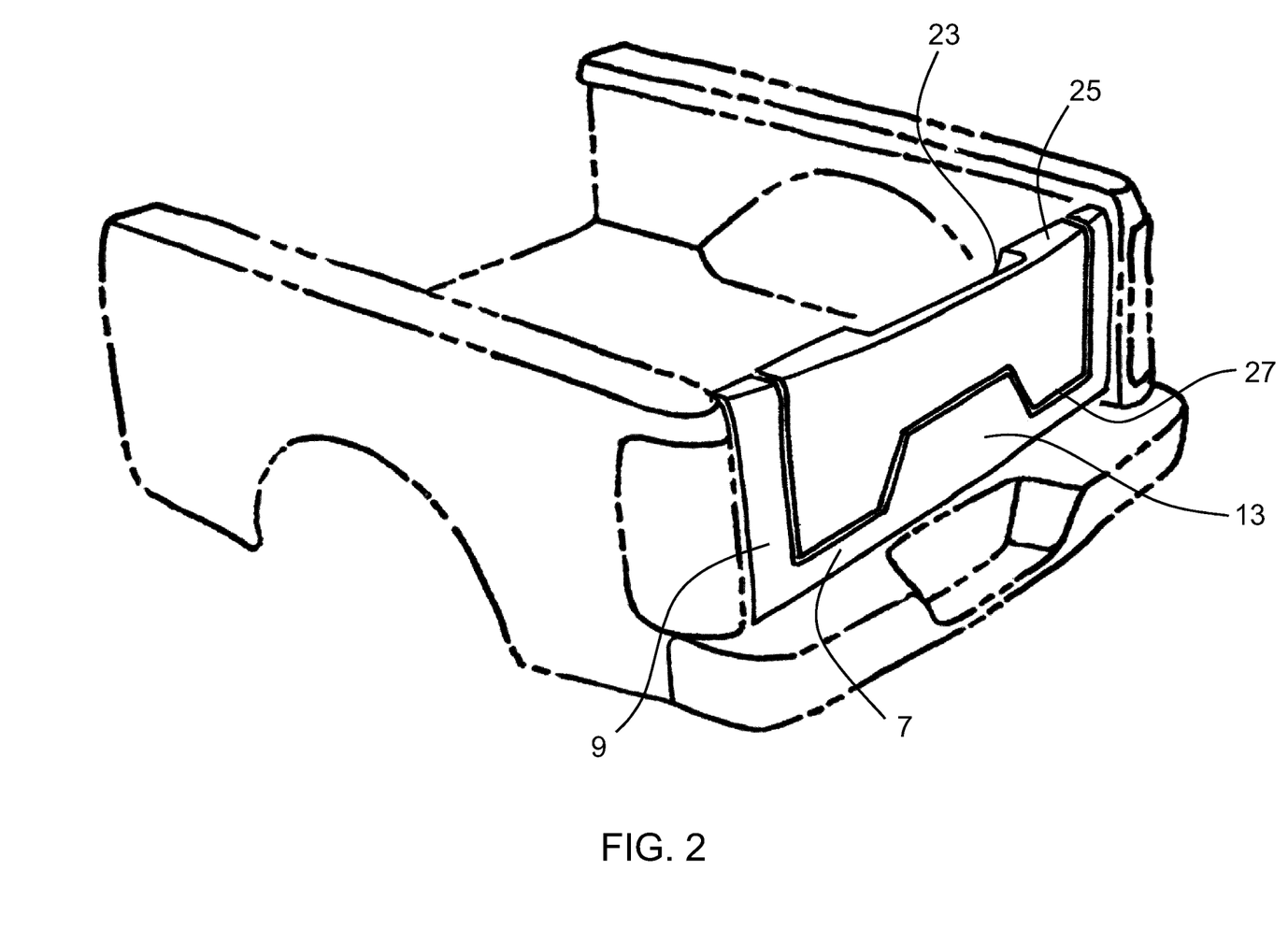
FIG. 2 is a perspective view of the tailgate assembly in the normal closed position.

The tailgate assembly further comprises a door 19 pivotally mounted to the support arms 9 of the frame 5. The door 19 is preferably mounted between the support arms 9 and is adapted to rotate along an axis X. The door 19 comprises an opening 21 which permits the door 19 to rest flush with the frame 5 with the central section 13 of the frame 5 occupying a space created in the door 19 by the opening 21 when the door 19 is closed. This may be referred to as the closed position, as illustrated in FIG. 2. In the closed position, the door 19 is aligned with the frame 5 in an essentially co-planar manner, as viewed from the rear of the vehicle 4.

Figure 3:
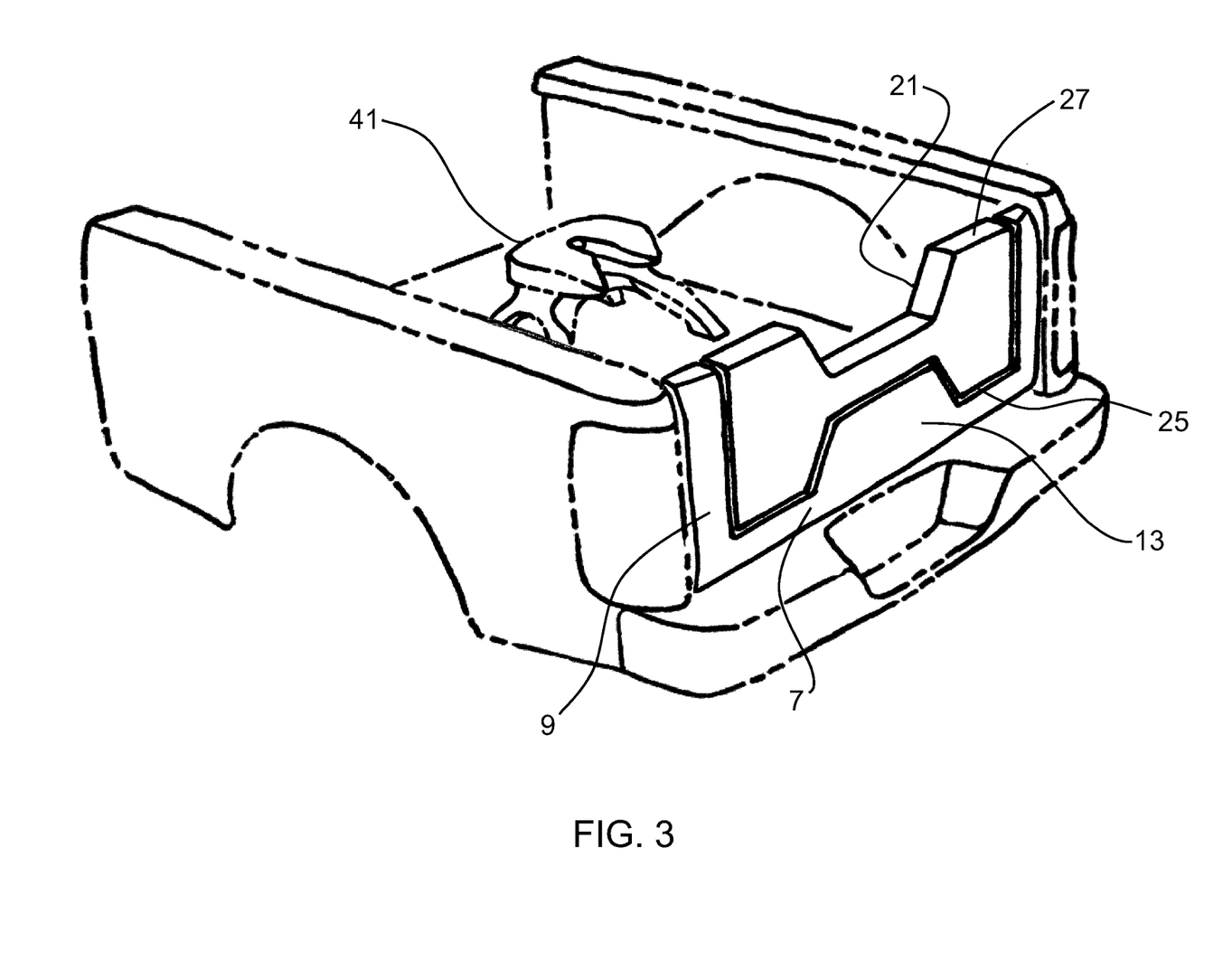
FIG. 3 is a perspective view of the tailgate assembly in the working position.

In addition, a cutaway portion 23 of the door 19 faces inwardly towards the truck body 3 when the door 19 is in the closed position. The cutaway portion 23 of the door 19 is shaped to correspond to the central section 13 of the frame 5. The door 19 has a thickness T. The cutaway portion 23 extends only part way into the door 19 and does not exceed the door thickness T. Thus, when viewed from the rear of the vehicle 4, the door 19 appears solid. The cutaway portion 23 is fully visible only from above the door 19, from the truck bed 15, and essentially from lines of sight between those positions. When the top 25 of the door 19 is rotated about axis X towards the truck bed 15, and the bottom 27 of the door 19 is correspondingly rotated away from the truck bed 15, the cutaway portion 23 mates with the central section 13 essentially at the limit of rotation of the door 19 in relation to the frame 5. This may be referred to as the working position, as illustrated in FIG. 3. In the working position, the door 19 is also aligned with the frame 5 in an essentially co-planar manner, as viewed from the rear of the vehicle 4. A principal difference between the working position and the closed position is that the opening 21 is open upwardly and centrally of the tailgate assembly 1 in the working position, thus creating a central recess in the door 19 below the plane of the upward facing bottom 27, whereas the opening 21 faces downwardly and engages with the central section 13 in the closed position, thus creating a plane upward facing surface 25 without an upward facing recess.

The door can be held in the closed position and in the working position by suitable latches or other holding means as known in the art of vehicle tailgates. Optionally, the door 19 may also be fully removed from the frame 5 using known tailgate mounting and dismounting techniques. The tailgate assembly is oriented vertically, and essentially perpendicularly to the truck bed 15, in both the closed position and the working position.

Figure 4A:
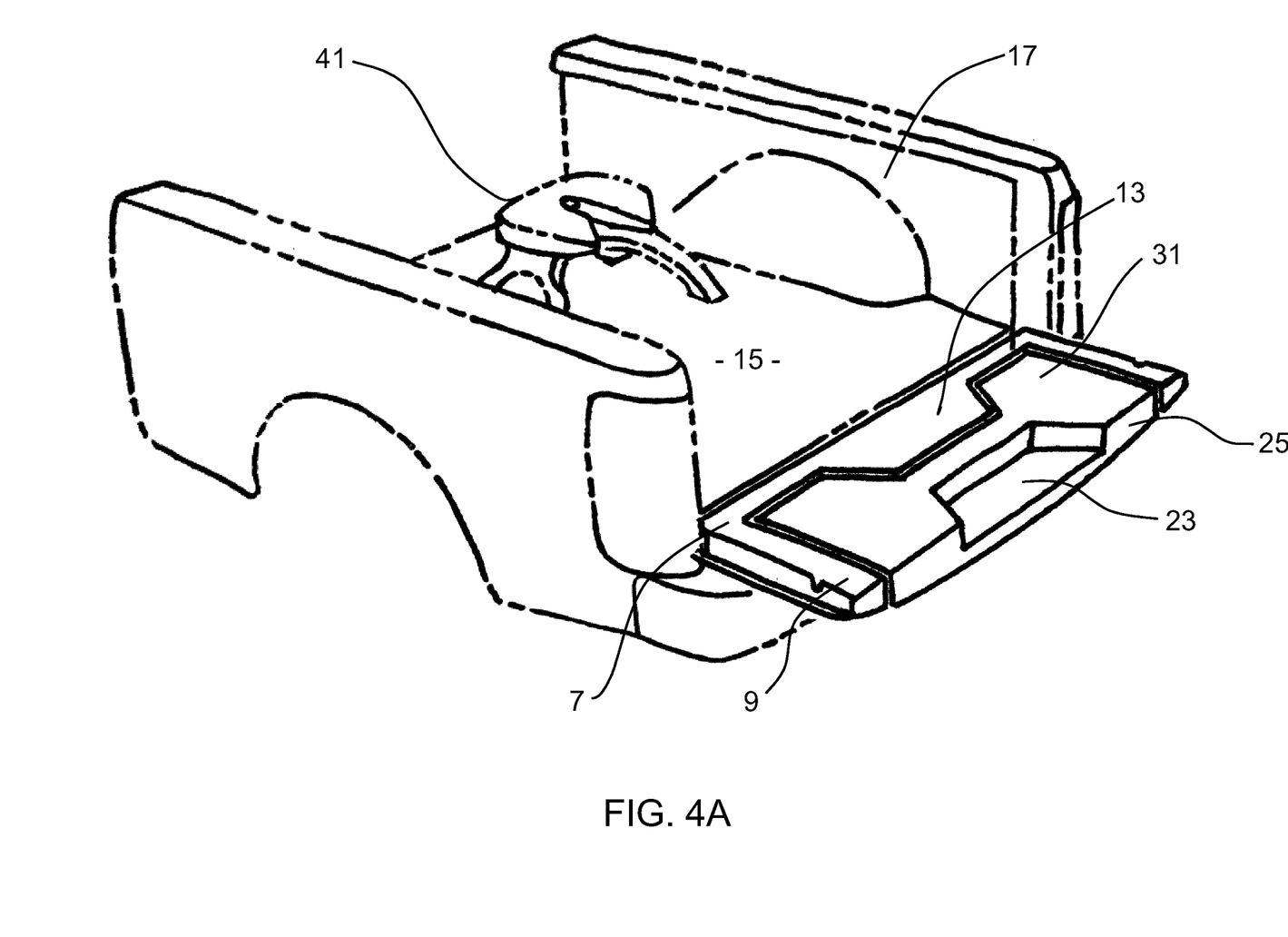
FIG. 4A is a perspective view of the tailgate assembly in a normal horizontal position.
Figure 4B:
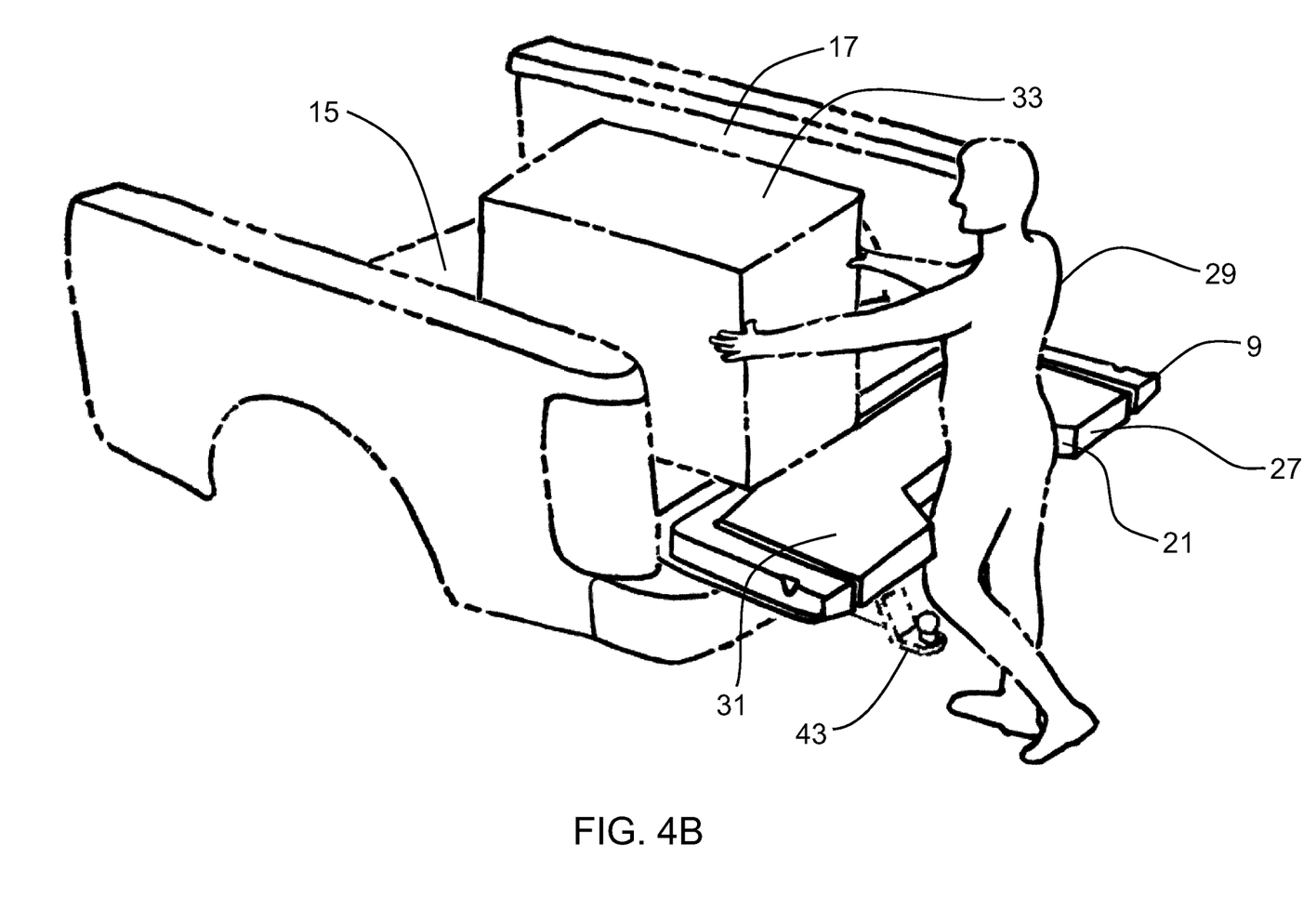
FIG. 4B is a perspective view of the tailgate assembly in a horizontal working position.

The tailgate assembly 1 may also be rotated from the working position to a horizontal position, as illustrated in FIG. 4. This may be called the normal horizontal position. This is accomplished by hinges mounted between the transverse base 7 and the truck bed 15 or body 3 in a conventional manner. When the tailgate assembly 1 is rotated to a horizontal position from the closed position, the tailgate assembly 1 is configured in a relatively conventional way, as illustrated in FIG. 4A. On the other hand, when the tailgate assembly 1 is rotated to a horizontal position from the working position, the tailgate assembly 1 is configured in an unconventional way, as illustrated in FIG. 4B. This may be called the horizontal working position.

In the horizontal working position, the opening 21 is oriented rearwardly. This horizontal working position has a number of advantages. For example, a vehicle user 29 may move closer to the truck bed 15 by occupying the space provided by the opening 21 when standing at the rear of the vehicle 4. In addition, in both the normal horizontal position and the horizontal working position, the flat upward face 31 of the tailgate assembly 1 (corresponding to the inwardly facing face of the tailgate assembly 1 in the closed position) allows appropriately shaped cargo 33 to be loaded in the truck bed 15.

Figure 5:
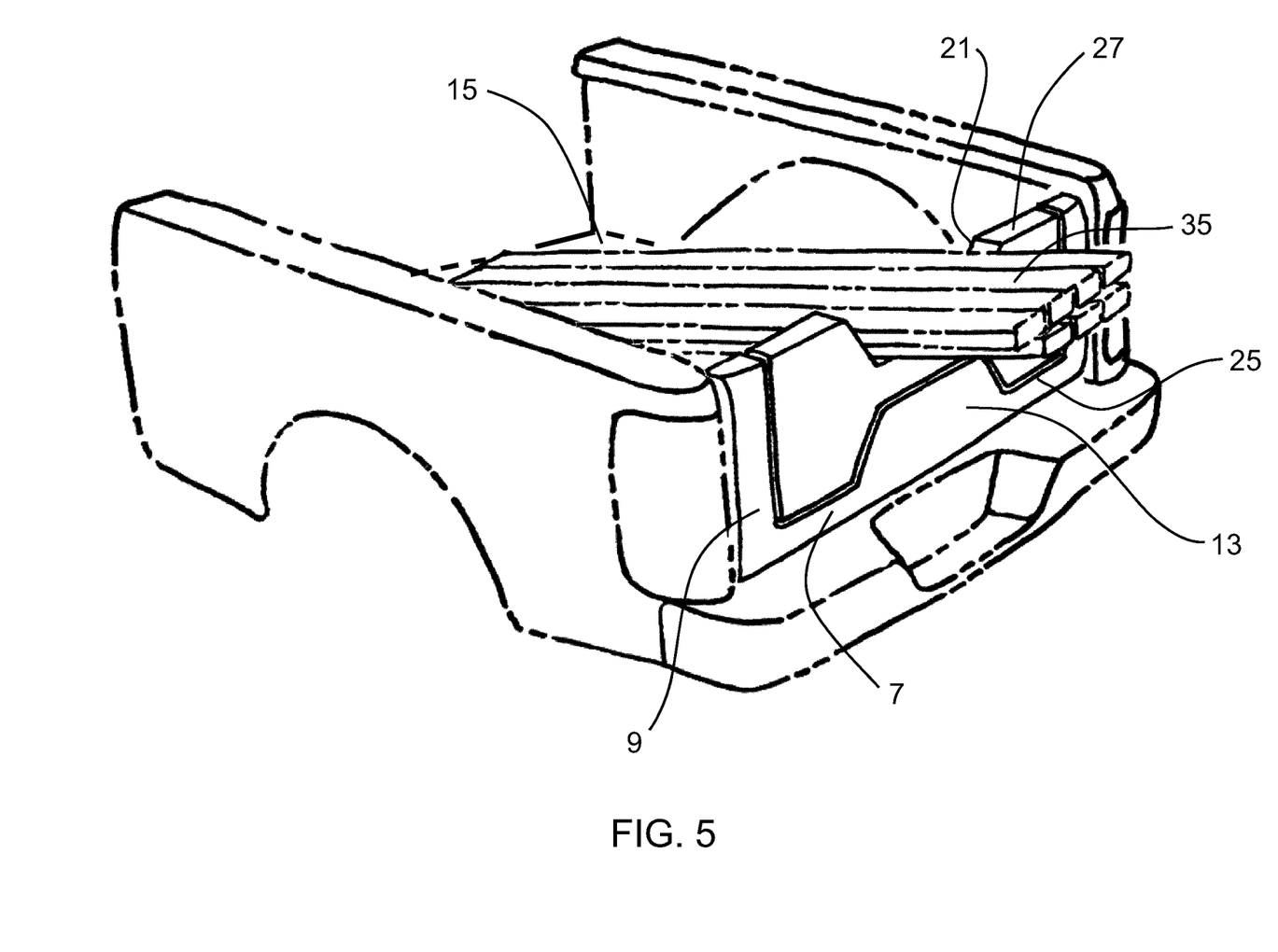
FIG. 5 is a perspective view of the tailgate assembly in the working position supporting long narrow cargo.

In the working position, the tailgate assembly is also adapted to accommodate suitably shaped long narrow cargo 35 in a cargo space bounded by the truck bed 15 and the side walls 17, as illustrated in FIG. 5. Such long narrow cargo 35 is restrained by the dimensions of the opening 21 in the door 19 from moving side to side in relation to the truck bed 15. The door 19 in the working position, however, does not restrain such narrow long narrow cargo 35 from moving forwards and backwards in the cargo space.

Figure 6:
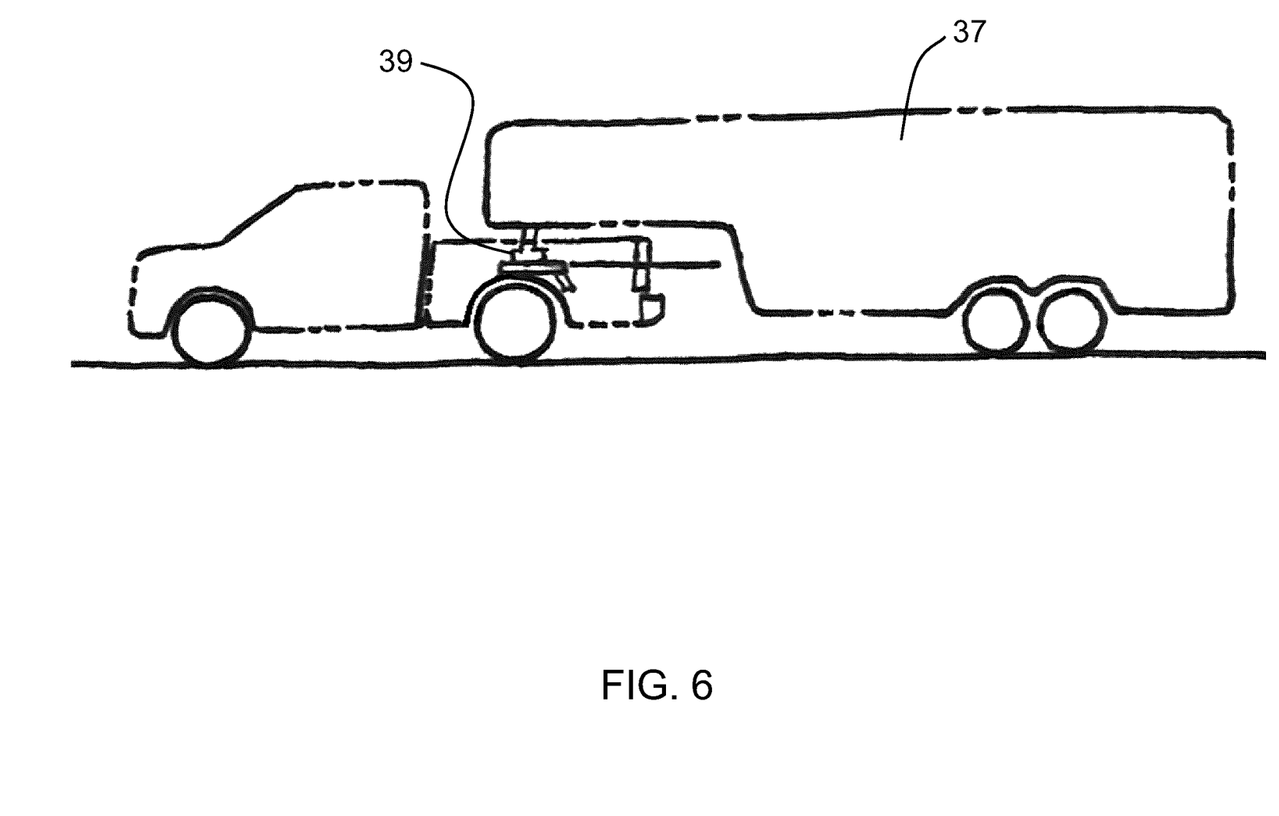
FIG. 6 is an elevation view of a trailer connected to a vehicle using a fifth wheel hitch.

One of the greatest benefits of the tailgate assembly 1 is its adaptability to the attachment of trailers to vehicles, particularly pick-up trucks. For example, as illustrated in FIG. 3 and FIG. 6, a trailer 37 with a mating assembly such as gooseneck 39 is adapted to be towed using a receiving assembly such as a fifth wheel hitch 41 attached to the truck bed 15 of a vehicle 4. Typically, the gooseneck 39 extends lower than the height of the side walls 17. Thus, a conventional tailgate, which rises to the height of the sidewalls 17, would have to be opened to attach the gooseneck 39 to the fifth wheel hitch 41. That would limit how closely the trailer 37 could approach the rear of the vehicle 4 with the conventional door in an open horizontal position, or even hanging down vertically, at least partially blocking the way. By contrast, the opening 21 facing upwardly with the tailgate assembly 1 of the invention in the working position typically provides sufficient clearance for the gooseneck 39 to be connected to the fifth wheel hitch 41. Thus, the trailer 37 can be brought close to the vehicle 4 without obstruction by the tailgate assembly 1. The added advantage of the working position is that the tailgate door 19 is closed thus preventing objects in the cargo space from accidentally being lost rearwardly while the vehicle 4 is moving.

Figure 7:
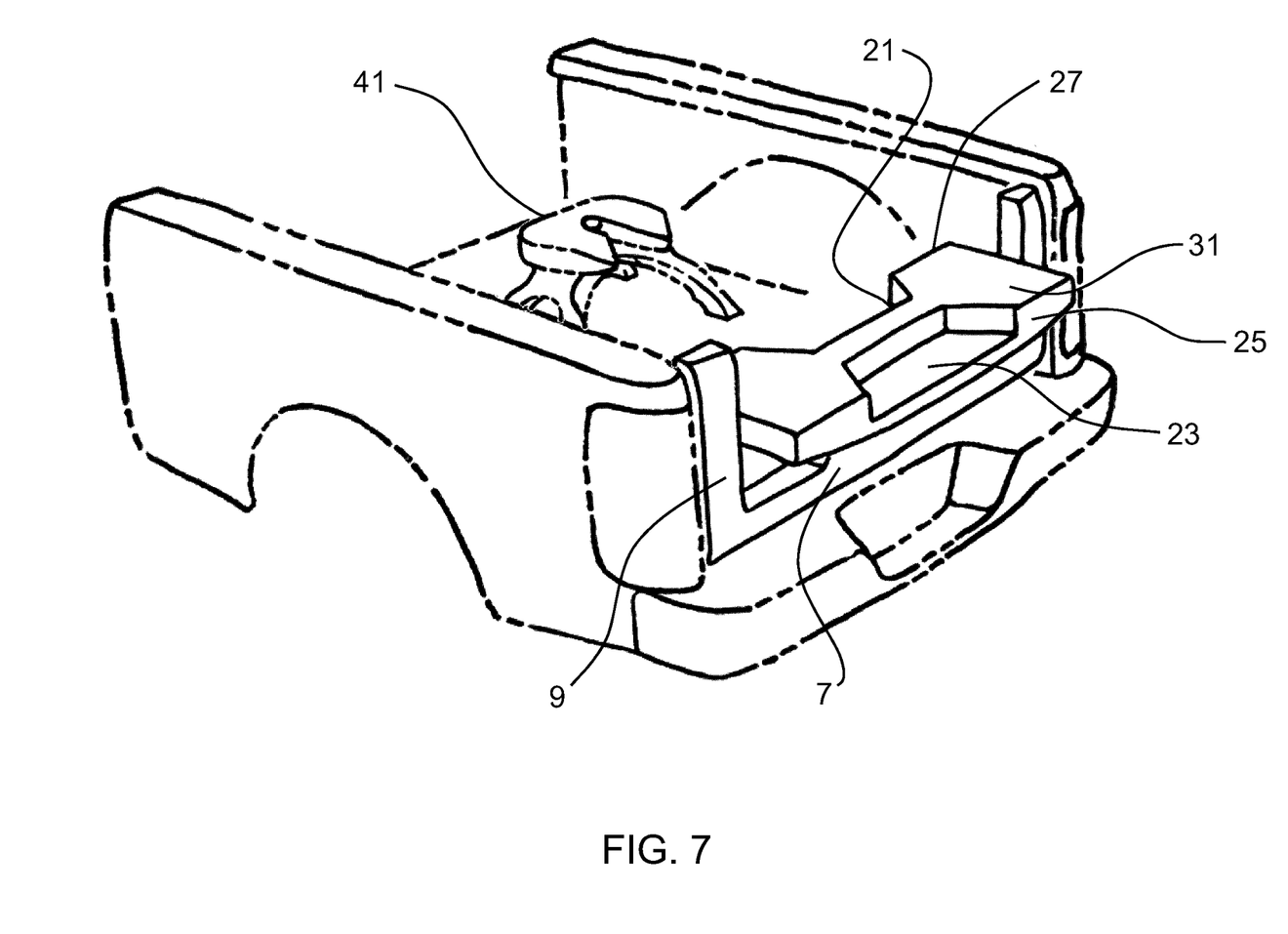
FIG. 7 is a perspective view of the tailgate assembly in the intermediate horizontal position.

Alternatively, the door 19 can be further rotated from the working position inwardly towards the truck bed 15 to an intermediate horizontal position as illustrated in FIG. 7. In the intermediate horizontal position, as compared to the working position, there is additional clearance for the gooseneck 39 to be connected to the fifth wheel hitch 41, although the door 19 extends rearwardly from the vehicle body 3 more than it does in the working position. Also, if the intermediate horizontal position must be maintained, there is the risk of loss of objects from the rear of the vehicle 4 while the vehicle 4 is in motion. If appropriate, the door 19 can be rotated rearwardly from the intermediate horizontal position to the working position following attachment of the gooseneck 39 to the fifth wheel hitch 41.

Figure 8:
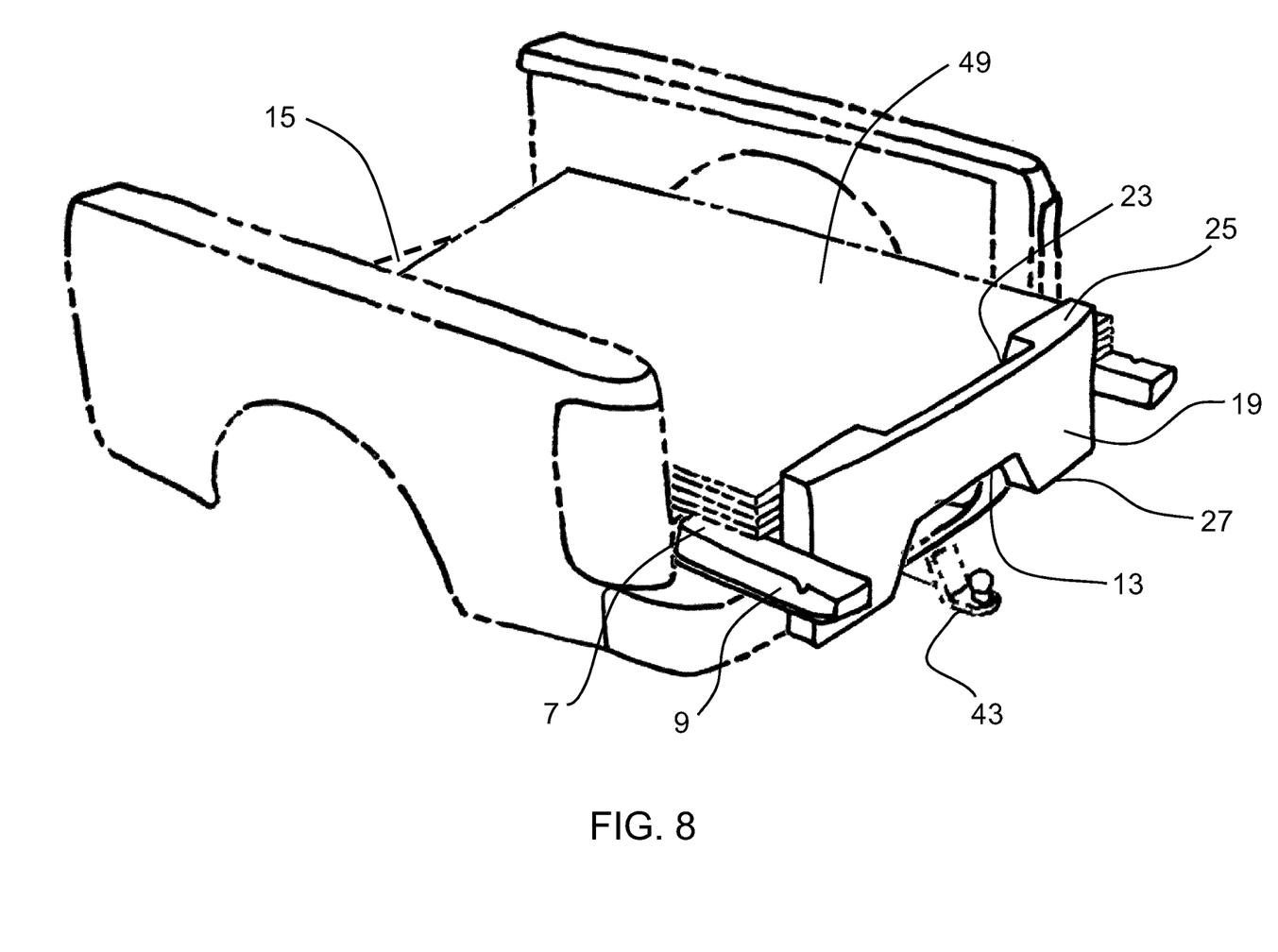
FIG. 8 is a perspective view of the tailgate assembly in the right angle position.
Figure 9:
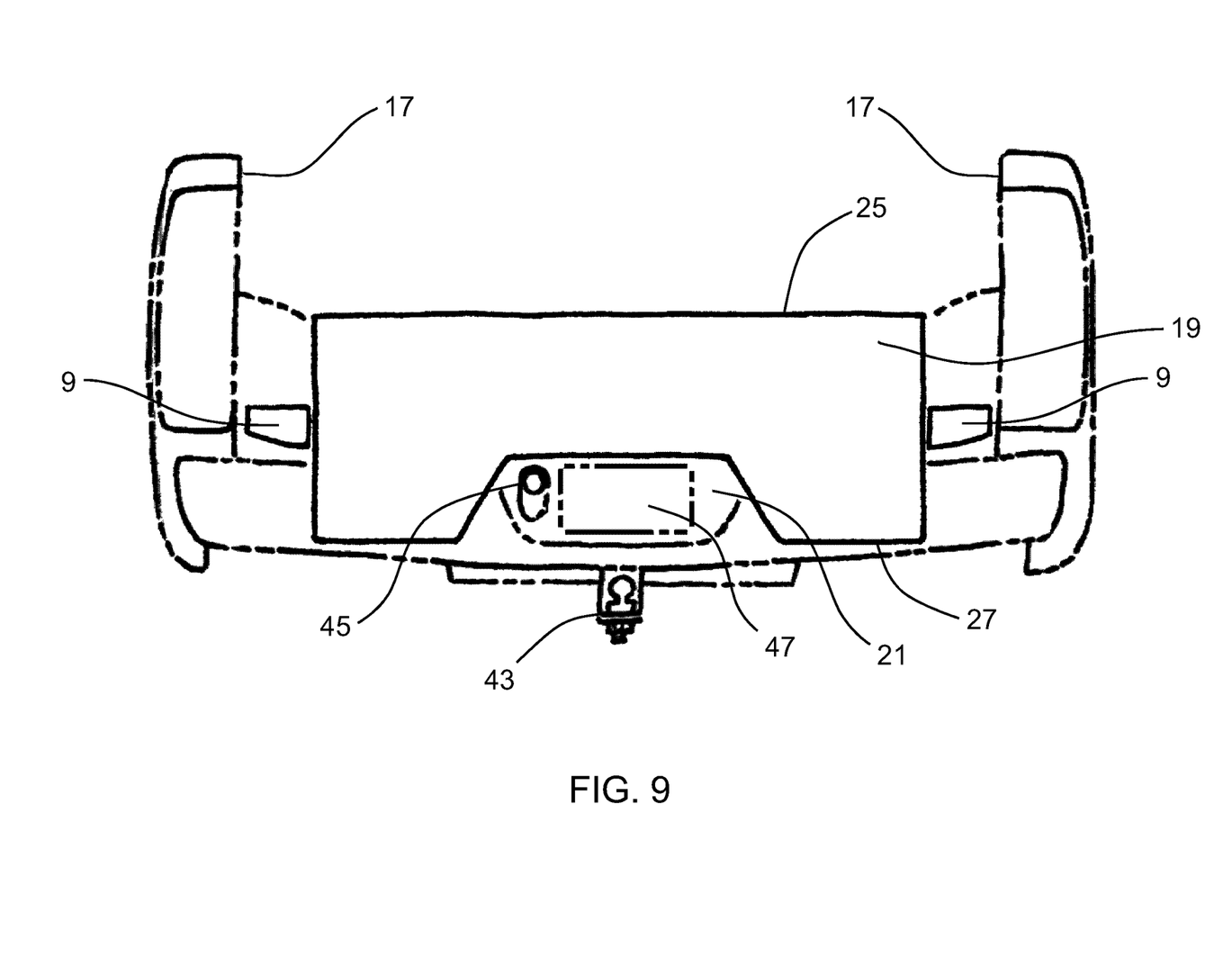
FIG. 9 is a rear elevation view of the tailgate assembly in the right angle position.

A further configuration of the tailgate assembly is particularly applicable to conventional lower mounted trailer hitches where the trailer hitch 43 is mounted below the truck bed 15 to the body 3. Beginning from the normal horizontal position, the arms 7 remain horizontal as the top 25 of the door 19 is rotated about axis X towards the truck bed 15 so that the opening 21 faces downwardly. This creates room for access to the trailer hitch 43 as illustrated in FIG. 8. It also allows access to accessories such as a trailer electrical plug 45 and permits a licence plate 47 to be visible, as illustrated in FIG. 9. This may be called the right angle position. With the tailgate assembly in the right angle position, the effective length of the truck bed 15 is extended. In other words, slightly extra-long cargo 49 may be carried on the truck bed yet be restrained from sliding rearwardly or falling off the truck while driving.

Figure 10A:
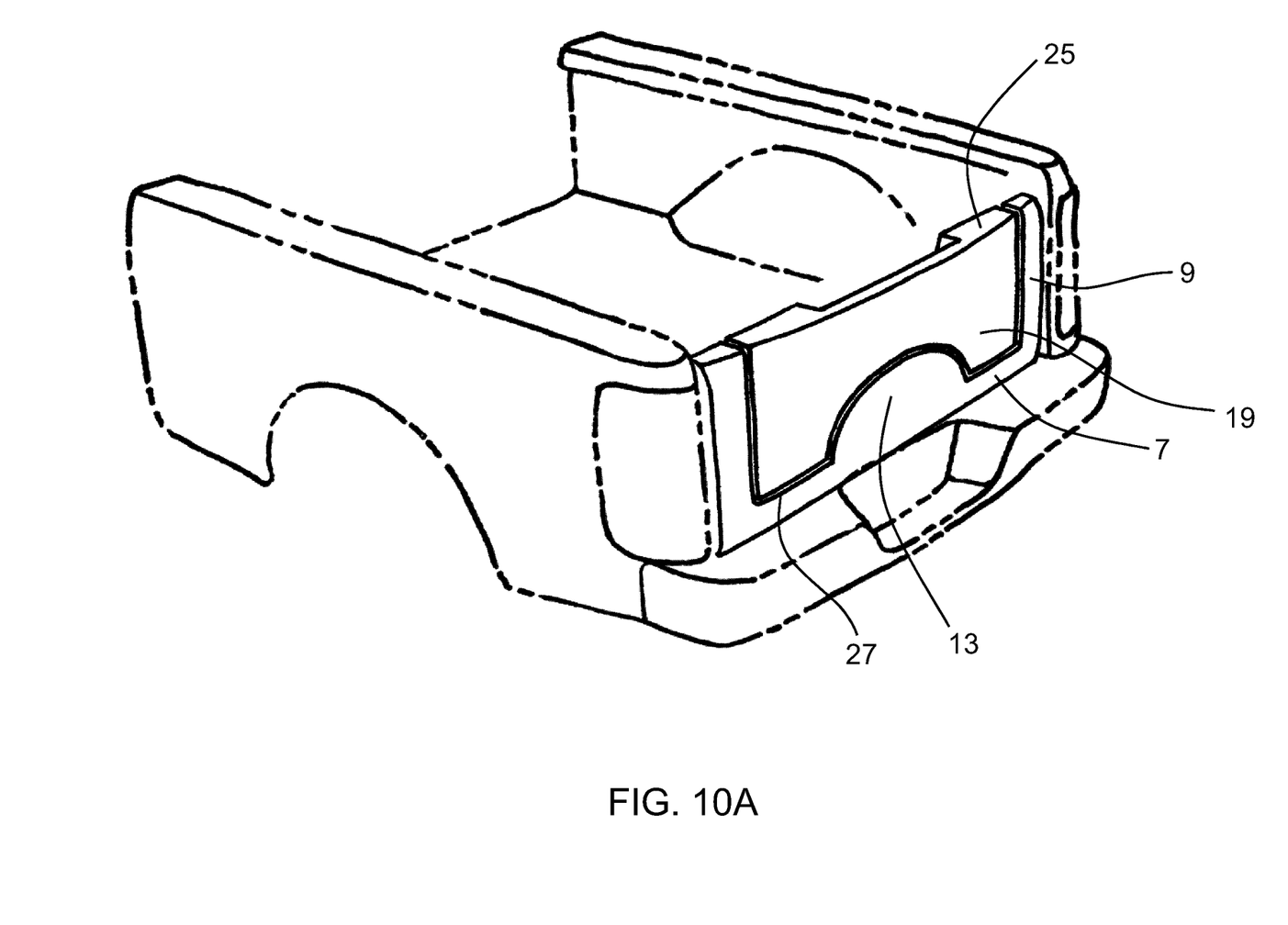
FIG. 10A is a perspective view of the tailgate assembly with a semi-spherical door opening and corresponding central section.
Figure 10B:
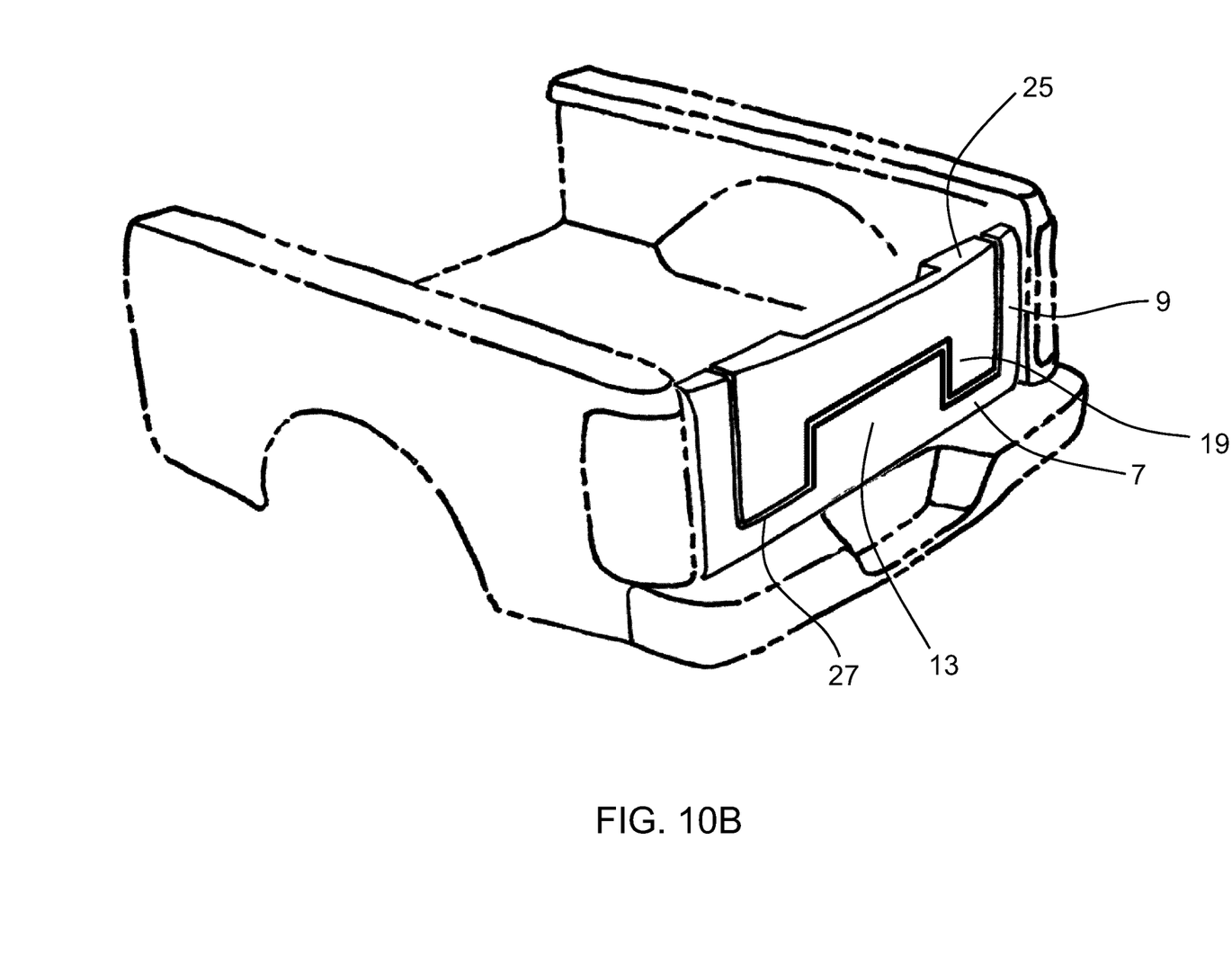
FIG. 10B is a perspective view of the tailgate assembly with a rectangular door opening and corresponding central section.
Figure 10C:
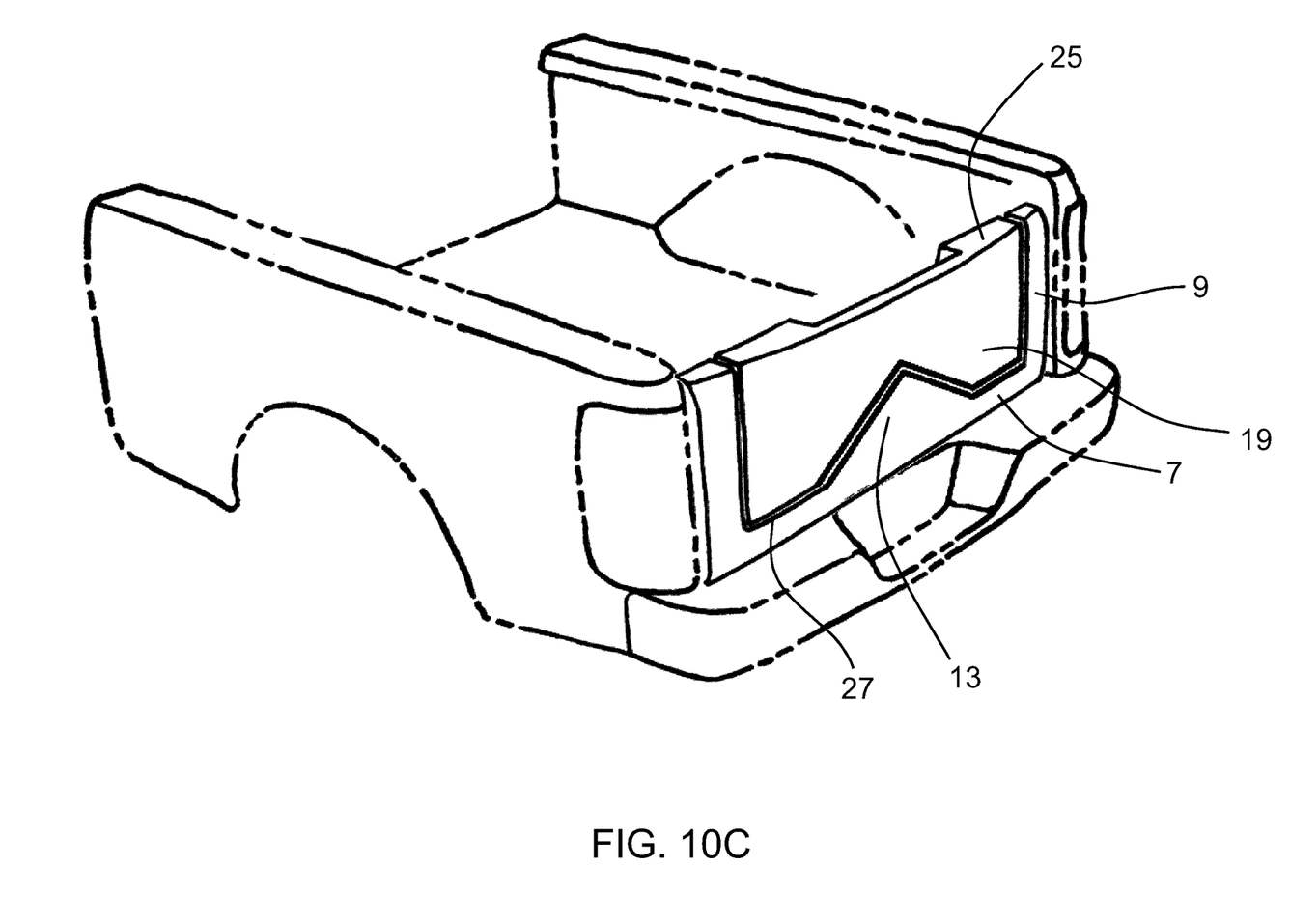
FIG. 10C is a perspective view of the tailgate assembly with a triangular door opening and corresponding central section.

It has been found that a trapezoidally shaped central section 13 and cutaway portion 23 are suited to the described tailgate assembly. Alternatively, other shapes including rectangular, triangular, hemispherical, etc., may be employed, as illustrated in FIGS. 10A, 10B and 10C.

The invention claimed is:

1. A vehicle tailgate assembly comprising:
   a frame with a transverse base and support arms extending perpendicularly therefrom adjacent distal ends of the base;
   a central section also extending perpendicularly from the base but to a lesser extent than the support arms;
   a door rotationally mounted to the frame between the support arms;
   the door being profiled with a central opening matching the central section and aligned therewith in a co-planar manner when the door is in a fully closed position;
   a mating portion comprising an indentation in the door adapted to mate with the central section when the door is rotated 180 degrees from the fully closed position to a working position to expose the central opening with the door co-planar with the frame.

2. The vehicle tailgate assembly of claim 1, wherein the door is releasably latched to the frame in the closed position and the working position.

3. The vehicle tailgate assembly of claim 1, wherein the central section is trapezoidal.

4. The vehicle tailgate assembly of claim 1, wherein the central opening is shaped to facilitate access of a trailer connector to a fifth wheel hitch mounted in a bed of a pick-up truck.

5. The vehicle tailgate assembly of claim 2, wherein the door is additionally releasably latched in at least one position which is not co-planar with the frame.

6. The vehicle tailgate assembly of claim 1, wherein the door and the frame in a co-planar orientation are adapted to be releasably latched in at least one position which is neither the fully closed position nor the working position.

7. The vehicle tailgate assembly of claim 1, wherein the tailgate assembly is releasably latched to the side walls of a pick-up truck cargo area.

8. The vehicle tailgate assembly of claim 1, wherein the door is latched in a horizontal orientation to the support arms.

9. The vehicle tailgate assembly of claim 1, wherein the support arms are latched in a horizontal orientation to a truck body and the door is latched in a vertical orientation to the support arms.

* * * * *